Dec. 30, 1958     E. B. GLENDENNING ET AL     2,866,694
ANTI-CLOGGING FUEL OIL COMPOSITIONS
Filed Sept. 2, 1950                                3 Sheets-Sheet 1
ILLUSTRATION OF PEPTIZATION - PRECIPITATION
OF ASPHALTENE PARTICLES
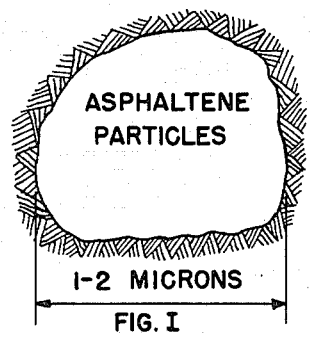
FIG. I
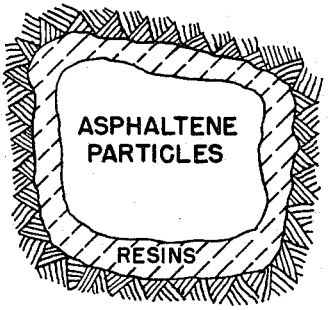
FIG. II
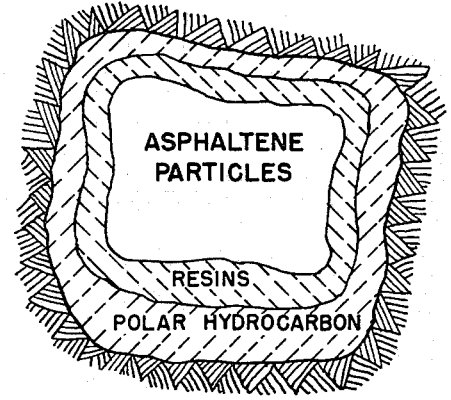
FIG. III
Inventors: Everett B. Glendenning
Calmy Wies
John B. R. Caron
By: *James Jodorovic*
Their Attorney

INDICATED MECHANISM OF THE AGGLOMERATION OF ASPHALTENE PARTICLES
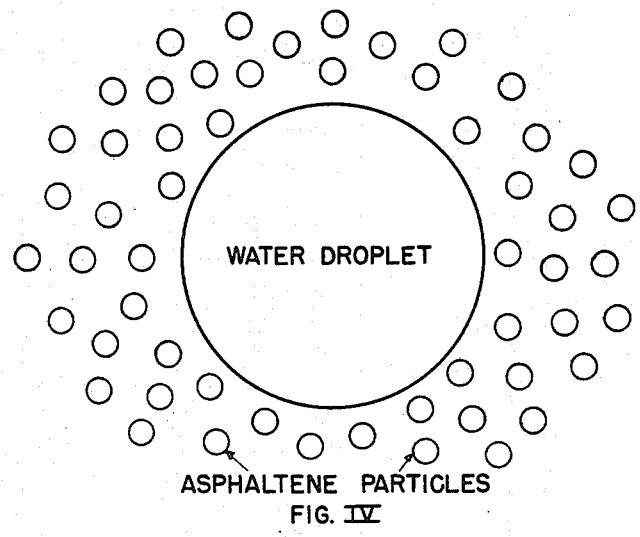
ASPHALTENE PARTICLES
FIG. IV
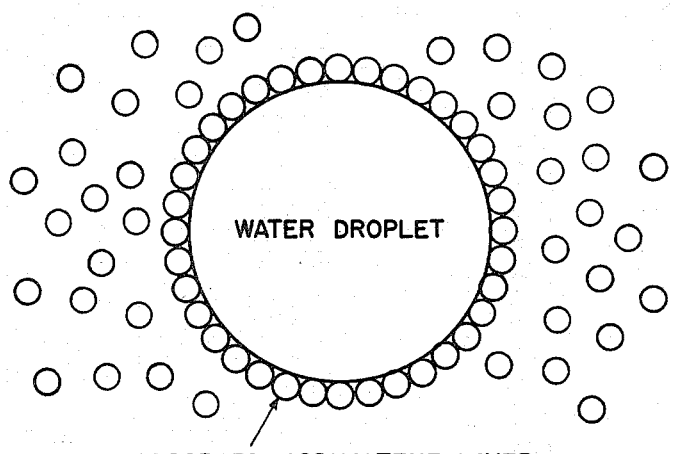
ABSORBED ASPHALTENE LAYER
FIG. V
Inventors: Everett B. Glendenning
Calmy Wies
John B. R. Caron
By: *James Todorovic*
Their Attorney Dec. 30, 1958 E. B. GLENDENNING ET AL 2,866,694
ANTI-CLOGGING FUEL OIL COMPOSITIONS
Filed Sept. 2, 1950 3 Sheets-Sheet 3
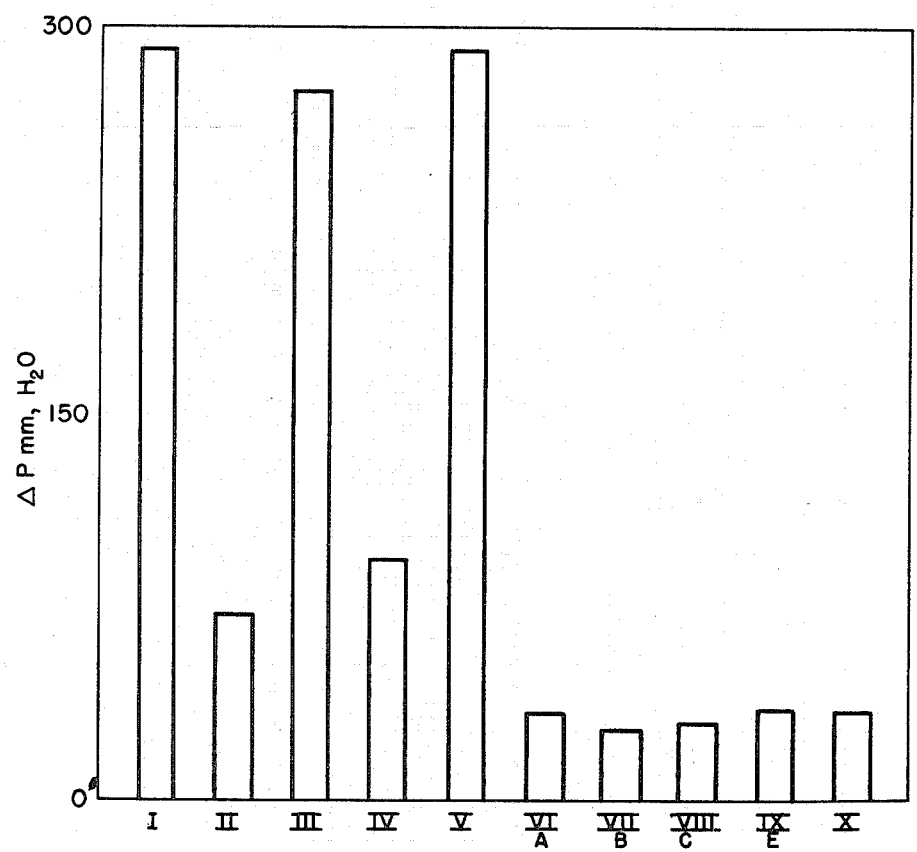
Fig. VI
Inventors: Everett B. Glendenning
Calmy Wies
John B. R. Caron
By: James Iodorovic
Their Attorney

2,866,694

ANTI-CLOGGING FUEL OIL COMPOSITIONS

Everett B. Glendenning, Cranford, N. J., Calmy Wies, New York, N. Y., and John B. R. Caron, North Plainfield, N. J., assignors to Shell Development Company, San Francisco, Calif., a corporation of Delaware Application September 2, 1950, Serial No. 182,963

The portion of the term of the patent subsequent to January 20, 1970, has been disclaimed 10 Claims. (Cl. 44—68)

This invention pertains to hydrocarbon fuels, and more particularly to fuel oil compositions with reduced sludging and/or clogging tendencies generally exhibited by hydrocarbon fuels, such as those utilized in burner systems, diesel and combustion engines, and various other industrial and domestic equipment. In addition, this invention relates to fuel oil compositions capable of removing preformed deleterious matter from filters, screens, and the like, caused by deterioration and/or the presence of foreign bodies (e. g. asphaltenes, water, etc.) in the fuel oils.

Hydrocarbons, fuel oils such as distillate fuels, for example, those having a normal distillation range of from about 300° F. to about 700° F. or within said range, and particularly from about 340° F. to about 640° F., generally have a marked tendency to deteriorate under oxidizing conditions, and to form sludge. Also, the presence of impurities in such fuels, such as the presence of dissolved moisture, dispersed water, asphaltenes, resins and other organic and/or inorganic foreign matter, and the like, causes the formation of insoluble products, which tend to settle out and adhere to surfaces with which they come in contact, thereby in turn causing clogging or plugging of filters, strainers, screens, conduit lines, and the like, of the equipment in which they are used. This necessitates frequent cleaning and even replacement of parts, thereby markedly decreasing the performance efficiency of various equipment which utilizes such fuel oils.

The problem of screen clogging is common, particularly in domestic fuel oil systems employing distillate fuel oils produced by distilling or cracking and distilling of petroleum, which fuels are characterized by their relatively low viscosity and other suitable properties. Fuel oils of this type generally conform to the specifications set forth in Commercial Standards C. S. 12–40 for Nos. 1, 2, and 3, Fuel Oils. Petroleum distillates within the ranges specified and which generally have an end-boiling point not exceeding 700° F., and preferably below 675° F., for use as diesel fuels are further examples of the type of oils which under conditions described have a tendency toward screen or filter clogging, particularly when they contain minor amounts of water dispersed therein.

Another place where screen clogging and plugging of conduit lines is encountered is in storage tanks for fuel oils, which tanks may be connected to the burner systems or engines, etc. The stored fuel generally comes in contact with air, moisture, water, etc., which cause formation and precipitation of sludge material which, in turn, deposit on and clog the screens or filters used for protecting the burners or engines which use such oils as the fuel.

Clogging of screens by fuel oils generally is caused by the presence in the fuel oil (which includes diesel fuel oil) of dispersed moisture and asphaltene particles or resinous materials capable of forming asphaltenes which are not entirely removed by refining methods. Other foreign materials, such as rust, dust and the like can aggravate the condition. Asphaltenes, and their precursors such as resins, are generally coated with heavy aromatics resulting in colloidal micelles that are rendered lyophilic (Figs. I to III). These asphaltene micelles when in contact with water droplets arrange themselves around water droplets as shown in Figs. IV and V and result in coagulation of particles which form a fibrous structure on contacting surfaces such as screens, causing clogging. Extraneous materials such as mentioned above if also present in the fuel are trapped mechanically by the screen and aggravate the situation.

It is an object of this invention to inhibit sludging tendencies of hydrocarbon fuel oils. It is another object of this invention to inhibit sludging and precipitation of contaminants in hydrocarbon distillate fuel oils, and particularly in cracked hydrocarbon fuels or distillate fuel oils containing a substantial proportion of cracked (e. g. catalytically cracked) hydrocarbon products. It is still another object of this invention to provide distillate fuel oils, particularly fuel oils obtained by cracking of hydrocarbons, either thermally or catalytically, which fuels have excellent performance characteristics with respect to freedom from screen clogging, even after extensive storage under oxidizing conditions and in the presence of water and other foreign bodies. Still another object of this invention is to provide a distillate fuel oil composition which is effective in removing preformed sludge deposits formed in fuel oil systems. Still another object of this invention is to provide distillate fuel oil compositions, and blends thereof, which are non-corrosive and stable, and which are effective for cleaning and for sludge removing.

Another object is to provide a fuel oil additive composition, as in the form of a concentrate, which is adapted to be added to a normally unstable fuel oil composition to improve the stability of said fuel and to reduce and even eliminate clogging susceptibilities or tendencies of said fuel.

The above and other objects of this invention may be attained by dispersing or dissolving in hydrocarbon distillate fuel oils (which normally have a tendency to cause clogging or plugging of screens, filters, conduit lines and the like), a minor amount, sufficient in combination to inhibit said tendencies, of a particular type of additive, which prevents fuel oils from clogging systems, and additionally aids in maintaining systems in contact with said fuels, clean and operating at maximum efficiency. According to this invention, the additive is a normal, inner and/or basic polyvalent metal salt of a high molecular weight organo sulfo and/or sulfate compound, and mixtures thereof.

It has also been found that a concentrate of said polyvalent metal salts of organo sulfo and/or sulfate compound in a suitable organic vehicle which is compatible with the fuel oil to be treated or improved, such as a hydrocarbon (petroleum) distillate fraction (kerosene) can be made, and that said concentrate can be blended with a fuel oil which has clogging tendencies to produce a final non-clogging fuel oil composition.

The hydrocarbon distillate fuel oils in which the active ingredient(s) of this invention is dispersed or dissolved may be treated or untreated catalytically cracked fuel oils, or mixtures of cracked fuels with straight-run distillate fuel oils, which have an initial distillation point of about 300° F. and an end distillation point preferably not exceeding 700° F., or one or both within said range. Generally, these fuels have a boiling range of from about 340° F. to about 700° F., and preferably a boiling range of from about 400° F. to about 675° F.

Cracked fuels may be obtained by thermal or catalytic cracking of certain petroleum hydrocarbon feed stocks. Both types of cracked fuels, as well as blends of cracked and straight-run fuels, may be acid and/or caustic treated to improve their stability. Specifically, hydrocarbon distillates which are utilized as bases in compositions of this invention are cracked gas oils, fuel oils, furnace oils, burner oils, diesel fuel oils, kerosene, etc., and mixtures of said cracked fuels with the corresponding or like straight-run hydrocarbon fractions, e. g. fuel oils, etc.

As examples, the properties of a caustic treated catalytically cracked light gas oil, and of a 50–50 blend of an untreated catalytically cracked light gas oil distillate fraction and of a straight-run acid-treated gas oil distillate fraction, both of which have marked tendencies toward clogging screens, etc., are given in the following tabulation:

| Properties | Catalytically Cracked Light Gas Oil | 50-50 Blend of Catalytically Cracked Light Gas Oil and Straight Run Light Gas Oil |
|---|---|---|
| Gravity, ° API | 31.0 | 32.6 |
| ASTM Dist. (° F.): | | |
| IBP | 434 | 414 |
| EBP | 620 | 664 |
| Sulfur, percent wt | 0.783 | 0.839 |
| Conradson Carbon Residue: | | |
| (10% Btms.) percent wt | 0.01 | 0.01 |
| Pour Point, ° F | −5 | 5 |

The organo sulfo and/or sulfate additive of this invention, which possesses the unique property of inhibiting sludge formation and of removing preformed deposits from surfaces (thereby preventing clogging of systems utilizing fuels normally susceptible of causing such deterioration) is a high molecular weight (above 430) polyvalent metal salt of an organic compound containing one or more sulfo and/or sulfate radical(s) in the molecule. The cationic portion of the molecule is connected to the anionic portion of the molecule through the sulfo or sulfate radical, said salt being normal, basic or an inner salt, in which the cation is preferably selected from group II of the periodic table of the elements, such as alkaline earth metals Mg, Ca, Ba and Sr. The cation, however, can also be selected from other polyvalent metals such as Zn, Al, Cu, Fe, Cd and Ni; mixtures of said polyvalent metal salts of organic sulfo compounds and organic nitrogen base salts of said sulfo acids wherein the nitrogen base can be alkyl, alkaryl, alkylol, alkylene, aralkyl, cycloalkyl amines, heterocyclic nitrogen base compounds such as oxazoline, morpholine, pyridine, piperidine, N-methyl piperidinium hydroxide; tributyl amine, alkyl amine and the like, can also be used.

The sulfo and/or sulfate organic compound may be produced by any suitable means, and the base material which is so treated may be any organic compound capable of being sulfonated or sulfated, to yield oil-soluble products, or products which are capable of being solubilized by suitable means.

Desired high molecular weight organic sulfo and/or sulfate compounds may be produced by sulfonating or sulfating various petroleum hydrocarbon fractions with sulfuric acid, oleum, chloro-sulfonic acid, sulfur trioxide, and their mixtures. Petroleum hydrocarbons may be treated with sulfur dioxide and a halogen and the resultant product hydrolyzed to produce sulfonated hydrocarbons. The petroleum hydrocarbons which may be sulfonated or sulfated may be aliphatic, cyclic and/or aromatic oil fractions and their mixtures, such as gas oil, kerosene, light oil, turbine oil, transformer oil, mineral lubricating oil, heavy oil, petroleum waxes and their mixtures.

Petroleum oil fractions which are particularly preferred for the production of the sulfo additives are derived from naphthenic oil stocks, that is, oils which contain at least an appreciable proportion of naphthenic-type hydrocarbons. Representative suitable naphthenic distillate stocks used for the preparation of sulfo products are distillates having the following broadly defined properties:

| | |
|---|---|
| Gravity, ° API | 22–27 |
| Viscosity, SSU, at 100° F | 150–1000 (400–900) |
| Viscosity index | 30–90 (40–75) |
| Flash (C. O. C.), ° F | 290–500 |

The following two distillate fractions are particularly preferred:

Motor oil stock solvent extraction raffinate—
| | |
|---|---|
| Gravity, ° API | 26.0 |
| Color, ASTM | 1½ |
| Flash (C. O. C.), ° F | 410 |
| Visc., SSU, at 100° F | 422 |
| Visc., SSU, at 210° F | 53.8 |
| Viscosity index | 56 |
| Aromatics by $SiO_2$-gel adsorption, percent wt | 17 |
| Molecular weight | 370 |

Refined transformer oil stock—
| | |
|---|---|
| Gravity, ° API | 29.1 |
| Color, ASTM | 1— |
| Flash (C. O. C.), ° F | 310 |
| Viscosity, SSU, at 100° F | 72.3 |
| Aromatics by $SiO_2$ adsorption, percent wt | 9 |

Representative characteristic properties of suitable Mid-Continent oils suitable for the preparation of the specified sulfo additives are as follows:

| | |
|---|---|
| Gravity, ° API | 26.0–29.5 |
| Pour point, ° F | 25–10 |
| Flash (C. O. C.), ° F | 410–445 |
| Fire, ° F | 500 |
| Viscosity, SSU at 100° F | 400–540 |

The above or like oils may be sulfonated by any known means. For example, an oil from the above classes having a Saybolt Universal viscosity at 100° F. of from about 150 to 1000 and preferably from about 400 to about 540 seconds may be treated with fuming sulfuric acid, added preferably incrementally. After a calculated amount of sulfuric acid has been added to the oil, the sludge which is formed is removed and the acid-treated oil containing dissolved oil-soluble sulfonic acids is neutralized with a suitable basic material, such as an aqueous solution of sodium hydroxide or the like. The remaining aqueous alkali solution is separated from the oil mixture, and the sodium salts of petroleum sulfonic acids extracted from the oil with aqueous alcohol; the alcohol can then be removed from the alcohol layer containing the sulfonates by distillation, or by any other suitable means. The recovered sodium salt of petroleum sulfonic acids is converted to the polyvalent metal salts of said acids by conventional means, as by reacting with an aqueous solution of calcium chloride.

Modifications of the above procedure can be made by removing acid sludge after the entire required amount of acid has been added. Also, the oil-soluble sulfonic acid can be removed from the oil before neutralization, as by aqueous alcohol extraction, rather than after as indicated above. Still another modification in preparing pure oil-soluble sulfonates is to add to the sludge-free acid-treated oil a solvent such as benzol, carbon tetrachloride, and the like and to neutralize said mixture with a caustic solution. The spent caustic solution is removed. The solvent is distilled off, leaving a substantially pure sulfonate in oil mixture. The product can be air blown and dehydrated to remove impurities. Instead of sulfonating a mineral oil alone, a small amount of waxy material may be added to obtain a more improved sulfonate. Petroleum sulfonates suitable for use in the present invention may be produced by the processes disclosed in the following U. S. patents: 2,388,677; 2,395,713; 2,413,199; 2,413,311; 2,414,773; 2,416,397; and if desired, the petroleum sulfonates may be purified by means disclosed in U. S. Patents 2,236,933; 2,334,532; 2,357,866; 2,368,452; 2,406,763.

A particularly useful method of preparing suitable sulfonates for the practice of the invention is described as applied to the motor oil raffinate characterized above. The motor oil raffinate (55–56 VI) was given an acid pretreatment with about 2% by weight of 98% sulfuric acid at around 140° F. The sludge formed was removed and the raffinate intimately contacted with about 20–25% of its weight of 105.5% fuming sulfuric acid (25% $SO_3$), 103.5 to 105.5% acid generally being preferred, while maintaining the temperature below about 150° F. and generally above about 75° F. After the oil-acid mixture had been intimately contacted, about 5 to 25% and preferably 12% of water (based on original oil charge) was added to the mixture at around 105° F., in the absence of any neutralizing basic substance, and the phases allowed to stratify. The oil phase was neutralized with 48° Bé. aqueous NaOH and on analysis disclosed the following:

| | |
|---|---|
| $RSO_3Na$ | percent wt 12 |
| Mol. wt | 460 |
| Inorganic salts | percent 2 |
| Water | do 3 |
| Oil | do 83 |

The above product can be concentrated and purified, if desired, in the following manner: To a sulfonated oil as identified above, a mixture of tertiary butyl alcohol and water is added and the phases formed allowed to stratify. To the middle phase which contains most of the alcohol and sulfonates, additional alcohol is added and any salt water phase formed is discarded. The alcohol-sulfonate phase is subjected to distillation and the sulfonate concentrate can be recovered as bottoms, which on analysis in a representative case showed the following:

| | |
|---|---|
| $RSO_3Na$ | percent wt 61 |
| Inorganic salt | do 0.4 |
| Water | do 5.0 |
| Oil | do 33.6 |
| Mol. wt | 460 |
| Neut. No | ±0.5 |
| Visc., SSF, at 180° F | 1200 |
| Color, ASTM, dilute | 8 |

The sodium sulfonate is converted to the alkaline earth metal sulfonate, such as the normal or basic Ca, Sr, Mg or Ba sulfonate or to other polyvalent metal sulfonates such as Al, Zn, Pb sulfonates by conventional means. The preferred sulfonated oils preferably should have a molecular weight of above 430 and preferably from 450 to about 650 or even as high as 980 and contain a plurality of cycloalkyl groups in the molecule.

In cases where the sulfonate is obtained from more highly naphthenic oils, the product need not be subjected to a high degree of purification. However, if less highly naphthenic oils, such as Mid-Continent oils, or blends of Mid-Continent and highly naphthenic oils, are used, it is preferable that the resultant oil-soluble sulfonated product be subjected to purification. This purification (which removes inorganic salts and other undesirable contaminants) may be carried out as follows: The crude sulfonate may be admixed with approximately an equal volume of a light hydrocarbon, such as a highly paraffinic hydrocarbon having a boiling range of from about 100° F. to about 260° F., and the resulting hydrocarbon layer containing the sulfonate removed by settling, decantation or the like, and the purified sulfonate recovered therefrom as a distillation residue. Alternatively, the highly paraffinic hydrocarbon may be added to the sour alcohol-sulfonic acid extract prior to neutralization, the entire mixture neutralized, as with aqueous sodium hydroxide, and the sulfonate recovered from the separated hydrocarbon phase.

Representative analyses of the sulfonate product before and after purification show the contents of impurities to be as given below:

| Impurities | Crude (Unpurified) Sulfonates (percent wt.) | Purified Sulfonates (percent wt.) |
|---|---|---|
| Sodium sulfate | 3.0–6.5 | less than 0.1. |
| Sodium hydroxide | 0.3–3.5 | less than 0.1. |
| Water | 5.6–9.6 | 0.2–7.8. |

An oil-soluble sodium petroleum sulfonate product produced from a 400 SSU at 100° F. Mid-Continent oil distillate fraction, when purified as just indicated, had the following composition:

*Composition of sodium petroleum sulfonate product obtained from a 400 SSU at 100° F. Mid-Continent distillate fraction solvent extraction raffinate*

| | Percent |
|---|---|
| Sodium petroleum sulfonate | 53.6 |
| Oil | 46.0 |
| Free alkali | 0.0 |
| Sodium sulfate | 0.0 |
| Water and alcohol | 0.4 |

The above sodium sulfonates are converted to the calcium petroleum sulfonates in the following manner. To sodium petroleum sulfonates as described above, an aqueous solution of calcium chloride and lime [$Ca(OH)_2$] is added and the mixture reacted at an elevated temperature of above 180° F. for a period of time such as from 2 to 5 hours. The reaction mixture is then cooled to about 140° F. and a hydrocarbon solvent such as a rubber solvent is added and the calcium petroleum sulfonate is extracted and subsequently recovered therefrom.

The following tabulation contains information pertinent to preparation of sodium petroleum sulfonates from a 400 SUS at 100° F. West Texas Ellenburger distillate fraction and conversion to the calcium salt, and the properties of said calcium petroleum sulfonate:

*Product from 400 SUS 100° F. WTE distillate*

| | |
|---|---|
| Water, percent | 1.0 |
| Na petroleum sulfonate, percent | 56.5 |
| Oil, percent | 35.5 |
| Water-soluble impurities, percent | 3.1 |
| M. W. of sulfonate | 650 |

*Conversion to calcium petroleum sulfonate*

| | |
|---|---|
| Sodium sulfonate product, parts by wt | 500 |
| $CaCl_2 \cdot 2H_2O$, parts by wt | 150 |
| $Ca(OH)_2$, parts by wt | 35 |
| Water, parts by wt | 175 |
| Time of reaction, hours | 3 |
| Temp. of reaction, °F | 180 |
| Conversion, percent wt | 85 |

*Properties of Ca petroleum sulfonate*

| | |
|---|---|
| Total base No | 12.8 |
| Percent sulfate ash | 9.5 |
| Control ratio | 1.35 |

Instead of forming the sodium petroleum sulfonates from the acid-treated oil first and then converting the sodium sulfonate to the polyvalent metal salt, the polyvalent metal salts of petroleum sulfonic acids can be formed direct from the acid oil by interaction with $CaCl_2$ or with $Ca(OH)_2$ or mixtures of $CaCl_2$ and $Ca(OH)_2$.

Instead of using petroleum hydrocarbons, as referred to above, mixtures of said petroleum hydrocarbon oils with olefins, olefin polymers, isoalkanes of high molecular weight, hydrocarbon rubber, cycloaliphatic hydrocarbons, alkylated aromatics such as keryl (alkyl radical of kerosene range aliphatic hydrocarbons) napthalene, alkyl phenol, natural fats, fatty oil, waxes, their fractions and derivatives can be used or these latter materials can be used per se to form the sulfonated products. Specifically, the following hydrocarbons and/or fatty materials may be sulfonated per se or admixed with petroleum fractions and sulfonated:

| | |
|---|---|
| Castor oil | Wool fat |
| Cocoanut oil | Japan wax |
| Corn oil | Olefin waxes |
| Cottonseed oil | Paraffin waxes |
| Horse fat | Wax tailings |
| Lard oil | Petrolatum |
| Mutton tallow | Vegetable and animal |
| Beef tallow | phosphatidic materials |
| Neat's-foot oil | Montan wax |
| Palm oil | Carnauba wax |
| Peanut oil | Beeswax |
| Rapeseed oil | Spermaceti |
| Soya bean oil | Castor oil distillate |
| Sperm oil | Ozokerite |
| Whale oil | Tall oil and the like. |

In addition to these oils and fats, their fatty acids, partial glycerides and the like can be used. Also free fatty acids of high molecular weight and having at least 12 carbon atoms, their esters and amides can be sulfonated and used as an additive of this invention particularly when in combination with an oil-soluble petroleum sulfonate.

Polyvalent metal salts of organic sulfates or mixtures of organic sulfates with any of the above sulfonates may be used. The preferred sulfates are the polyvalent metal lauryl sulfate, octyl sulfate, hexyl sulfate, cetyl sulfate, ricinoleyl sulfate; oleyl sulfate; salts of sulfated alcohols having between about 10 to 20 carbon atoms in the molecule; polyvalent metal salts of acid esters of sulfuric acid, e. g. cetyl acid sulfate, terpinyl acid sulfate, cyclohexyl acid sulfate, methylcyclohexyl acid sulfate, cetylphenyl acid sulfate, cetylbenzyl acid sulfate; metal salts of esters of sulfate polycarboxylic acids, e. g. salts of bis(2,4-dimethyl pentyl-1) sulfate-succinate, salts of sulfuric acid ester of bis(2-ethylhexyl)mucate and the like.

The following table gives typical examples of preferred normal, basic or inner metallic salts of sulfo and/or sulfate-containing compounds which are advantageously used in compositions of this invention:

| Cation Part | Anion Part |
|---|---|
| calcium. | (Petroleum sulfonic acid obtained from mineral oil, lubricating oil, with or without the addition of petrolatum.) |
| barium. | |
| magnesium. | |
| strontium. | |
| aluminum. | benzene sulfonic acid. |
| tin. | toluene sulfonic acid. |
| lead. | tri-isopropyl naphthalene sulfonic acid. |
| vanadium. | |
| bismuth. | amyl naphthalene sulfonic acid. |
| chromium. | diwax benzene sulfonic acid. |
| molybdenum. | diwax benzene disulfonic acid. |
| manganese. | alkyl phenol sulfide sulfonic acid. |
| iron. | diwax naphthalene sulfonic acid. |
| cobalt. | lauryl sulfonic acid. |
| nickel. | oleyl sulfonic acid. |
| zinc. | ricinoleo sulfonic acid. |
| | terpinyl acid sulfate. |
| | cyclohexyl acid sulfate |
| | cetyl phenyl acid sulfate. |
| | diamyl phenyl sulfostearyl amide. |
| | bis-sulfo succinamide. |
| | bis-sulfate succinamide. |

In the preparation of the additive concentrate of the invention, the sulfo and/or sulfate salt can be present in the base or concentrate distillate oil fraction in an amount varying from about 2% to 30% and preferably from 5% to about 20% by weight. However, greater or lesser amounts may be used with satisfactory results. With high concentrations of the additive agent(s), the proportion of concentrate required to be added to the fuel is reduced correspondingly so that the influence of the concentrate oil portion is minimized and less regard need be had for the actual nature of the oil components of the concentrate.

For use in systems wherein substantial amounts of moisture are present, a drying agent may be added which is compatible with the active ingredients of this invention. By tying up a substantial portion of the free moisture in this manner, the amount thereof which would be available to contribute to sludge-formation is diminished, thus reducing somewhat the requirements for the essential anti-clogging agents.

Drying agents which are particularly suitable are the glycol-ethers, such as diethylene glycol monomethyl-; ethyl-, n- and isopropyl ether, diethylene glycol monobutyl ether, diethylene glycol monodecyl ether, etc.; also dipropylene glycol monoethyl ether, dipropylene glycol monoisopropyl ether, dipropylene glycol monoisoamyl ether, diisobutylene glycol-monoisopropyl ether, ethylene-propylene glycol monoethyl ether, ethylene-isobutylene glycol monoisopropyl ether, etc. Instead of the glycol-ethers, various alcohols may be used, such as diols having six or more carbon atoms in the molecule, e. g. hexylene glycol, decylene glycols, cetylene glycols, etc.; diglycols such as dipropylene glycols, dibutylene glycol, diamylene glycol, ditrimethylene glycol ether alcohols and particularly the glycol monoalkyl ethers, e. g. the cellosolves such as ethylene glycol monoethyl ether, ethylene glycol monopropyl ether, ethylene glycol monobutyl ether, ethylene glycol monoisobutyl ether, ethylene glycol monotert-butyl ether, ethylene glycol monohexyl-butyl ether, propylene glycol monoisoamyl ether, etc. Also glycerine and the like may be used.

The amount of these materials, when used, may constitute a substantial portion of the base or concentrate, and generally is up to about 20%. However, these materials may be omitted from the base.

The following is a general formula of a base (concentrate) composition of this invention, the percentages being by weight:

| | General Range, percent | Preferred Range, percent |
|---|---|---|
| Polyvalent metal oil-soluble organic sulfo and/or sulfate, e. g. oil-soluble Ca petroleum sulfonates of high molecular weight (450–920) | 2–30 | 5–20 |
| Drying agent | 0–20 | |
| Hydrocarbon petroleum distillate fraction having a boiling point between 300 and 700° F | Balance | Balance |

Specific base compositions are illustrated by the following examples:

*Composition A*

Percent

Oil-soluble calcium petroleum sulfonate derived from naphthenic oil having mol. wt. 460_____ 15
Kerosene _____ 85

*Composition B*

Oil-soluble calcium petroleum sulfonate derived from naphthenic oil having mol. wt. 672_____ 25
50–50 blend of catalytically cracked light gas oil and straight run acid treated gas oil_____ 75

*Composition C*

Oil-soluble basic calcium petroleum sulfonate derived from naphthenic oil having mol. wt. 486–500 _____ 15–25
50–50 blend of catalytically cracked light gas oil and straight run acid treated gas oil_____ 85–75

*Composition D*

Oil-soluble calcium petroleum sulfonate derived from naphthenic oil having mol. wt. 625_____ 15–25
Caustic treated catalytically cracked light gas oil__ 85–75

Composition E

| | |
|---|---|
| Oil-soluble barium petroleum sulfonate derived from naphthenic oil having mol. wt. 460 | 15 |
| Kerosene | 85 |

Composition F

| | |
|---|---|
| Oil-soluble basic barium petroleum sulfonate derived from naphthenic oil having mol. wt. 460 | 15–25 |
| Barium salt of oil-soluble condensation product of p-octylphenyl-formaldehyde and having a molecular weight of about 500–1100 | 10 |
| Caustic treated catalytically cracked light gas oil | 85–75 |

Composition G

| | |
|---|---|
| Calcium petroleum sulfonate derived from naphthenic oil having mol. wt. 860–920 | 15–25 |
| No. 2 fuel oil comprising a mixture of straight-run and cracked gas oil having an end distillation point of from about 580° F. to 610° F. | 85–75 |

The following table further illustrates suitable anti-clogging base compositions of this invention, wherein the indicated substances are incorporated in kerosene within the range of proportions already indicated:

maintained by metering pumps and the pressure drop (P) across the screen is measured by means of an open end monometer. The compositions tested were as follows and the results were as shown graphically in Fig. VI:

I. Fuel oil (containing 2–4 mg. $H_2O$/ml. oil)
II. Fuel oil (I) containing .005% Ca salt of octylphenol-formaldehyde condensation product.
III. Fuel oil (I) containing .0075% Na petroleum sulfonate derived from paraffinic oil stock and having molecular weight below 350
IV. Fuel oil containing 0.005% Ca petroleum sulfonate (M. W. 350)
V. Fuel oil containing .0315% Ba dialkyl phenol disulfide
VI. Composition A (1 pint/250 gal. of fuel oil (I))
VII. Composition B (1 pint/250 gal. of fuel oil (I))
VIII. Composition C (1 pint/250 gal. of fuel oil (I))
IX. Composition E (1 pint/250 gal. of fuel oil (I))
X. Composition 2 (1 pint/250 gal. of fuel oil (I))

In order to determine the storage stability of fuel oils I to IX as identified above, each of these fuel oil compositions was stored for a period of six months and

| | Compositions | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Primary Additives: | | | | | | | | | | | | | | | |
| Ba diwax benzene sulfonate | x | | | | | | | x | | x | x | | | | x |
| Mg diwax phenol sulfonate | | | x | | | | | | | | | | | | |
| Basic Ca diwax naphthalene sulfonate | | x | | | | | | | | | | | | | |
| Basic Ca keryl benzene sulfonate | | | | | | | | | | | | x | | | x |
| Basic Ba keryl phenol sulfonate | | | | x | x | | | | | | | | | | |
| Al petroleum sulfonate | | | | | | | x | | | | | x | | x | |
| Zn petroleum sulfonate | | | | | | x | | x | | | | | x | | |
| Ca salt of sulfated castor oil | | | | | | x | | | x | | | | | | |
| Ca alkyl ($C_5$–$C_{20}$) phenol sulfonate | | | | | | | | | | x | | | | | |
| Ca alkyl ($C_5$–$C_{20}$) naphthalene sulfonate | | | | | | | | | | | | x | | | |
| Optional additives: | | | | | | | | | | | | | | | |
| Diethylene glycol monobutyl ether | | | | | | | | | | x | | | | x | |
| Ethanolamine oleate | | | | | | x | | | | | | | | | |
| Ca petroleum naphthenate | | | | | | | | | | | x | | | | |

Concentrate (base) compositions of this invention are generally utilized in proportions of 1 pint or less with from about 250 to about 100 gallons of the fuel oil. Thus, for example, on a percentage basis of fuel used, one pint of any one of the compositions described above per 250 gallons of fuel would correspond to approximately the following concentration of the active ingredients in the final fuel compositions:

Oil-soluble polyvalent metal salt of organic sulfonic acid such as derived from a naphthenic petroleum oil, from about 0.0025% to about 0.05%; drying agent (glycol-ether), from zero to about 0.03%.

To inhibit any corrosive tendencies of fuel compositions of this invention a minute amount of caustic or aromatic nitrogen compound, such as aniline, may also be added. These compounds act as alkaline reserves and render the fuel compositions substantially non-corrosive to copper, brass and other metals.

The unexpected and superior results of compounded fuel oils of this invention over straight fuel oils as well as over well-known compounded fuel oils is illustrated graphically in Fig. VI. The fuel oils tested (as identified hereinbelow) were subjected to a modified Shell Union test, which is essentially as follows: Approximately one gallon of the test fuel is filtered through a 200 mesh screen and thereafter steamed and circulated through a 100 mesh Monel screen ⅝" in diameter at the rate of 36 ml./min. for a period of 16 hours at room temperature. The extent of screen clogging is measured by the pressure drop across the screen. A constant flow rate is thereafter subjected to the Shell Union test already described. The results were as follows:

| Compositions | Rating [1] |
|---|---|
| I to V | Poor. |
| VI to X | Excellent. |

[1] $\Delta P$=0–20 mm. $H_2O$; Excellent. $\Delta P$=above 30 mm. $H_2O$; Poor.

To compositions of this invention may be added minor amounts of foam inhibitors, such as a silicone liquid, e. g. dimethyl silicone, fluoro organic compounds, fluoro paraffins, salts of organic and inorganic acids such as soaps, phosphates, and the like. Compositions of this invention are non-corrosive as well as inhibit corrosion and do not interfere with the function of the fluid in which they are dispersed.

This application is a continuation-in-part of our co-pending application Serial No. 17,804, filed March 29, 1948, and which has matured into U. S. Patent No. 2,527,987.

The invention claimed is:

1. A non-clogging fuel oil consisting essentially of a fuel oil, normally susceptible to cause clogging due to the presence of cracked components in the fuel oil, and containing in combination therewith a minor amount sufficient to inhibit said clogging of an oil-soluble polyvalent metal organic sulfonate.

2. A non-clogging fuel oil consisting essentially of a fuel oil normally susceptible to cause clogging due to the presence of cracked components in the fuel oil containing in combination therewith a minor amount sufficient to inhibit clogging of a polyvalent metal organic sulfonate having a molecular weight range of from 430 to 980.

3. A non-clogging fuel oil consisting essentially of a fuel oil normally susceptible to cause clogging due to the presence of cracked components in the fuel oil, containing in combination therewith from 0.0025% to about 0.05% of a polyvalent metal organic sulfonate having a molecular weight range of from 430 to 980.

4. A non-clogging fuel oil consisting essentially of a fuel oil, normally susceptible to cause screen clogging due to the presence of cracked components in the fuel oil, and containing in combination therewith a minor amount sufficient to inhibit said clogging of a salt selected from the group consisting of the calcium and barium salts of oil soluble petroleum sulfonic acids.

5. A non-clogging fuel oil consisting essentially of a fuel oil normally susceptible to cause clogging due to the presence of cracked components in the fuel oil, containing in combination therewith from 0.0025% to about 0.05% of calcium petroleum sulfonate having a molecular weight range of from 430 to 980.

6. A non-clogging fuel oil consisting essentially of a fuel oil normally susceptible to cause clogging due to the presence of cracked components in the fuel oil, containing in combination therewith from 0.0025% to about 0.05% of barium petroleum sulfonate having a molecular weight range of from 430 to 980.

7. A non-clogging fuel oil consisting essentially of a fuel oil normally susceptible to cause clogging due to the presence of cracked components in the fuel oil, containing in combination therewith from 0.0025% to about 0.05% of an alkaline earth metal petroleum sulfonate having a molecular weight range of from 430 to 980.

8. A non-clogging fuel oil consisting essentially of a fuel oil normally susceptible to cause clogging due to the presence of cracked components in the fuel oil, containing in combination therewith from 0.0025% to about 0.05% of an oil-soluble alkaline earth metal phenol sulfonate having a molecular weight range of from 430 to 980.

9. A non-clogging fuel oil consisting essentially of a fuel oil normally susceptible to cause clogging due to the presence of cracked components in the fuel oil, containing in combination therewith from 0.0025% to about 0.05% of Ca alkyl ($C_5$–$C_{20}$) phenol sulfonate having a molecular weight range of from 430 to 980.

10. A non-clogging fuel oil consisting essentially of a fuel oil normally susceptible to cause clogging due to the presence of cracked components in the fuel oil, containing in combination therewith from 0.0025% to about 0.05% of an oil-soluble barium alkyl phenol sulfonate having a molecular weight range of from 430 to 980.

References Cited in the file of this patent

UNITED STATES PATENTS

| | | |
|---|---|---|
| 2,141,848 | Adams et al. | Dec. 27, 1938 |
| 2,161,317 | Sachanen et al. | June 6, 1939 |
| 2,296,069 | Talbert et al. | Sept. 15, 1942 |
| 2,316,739 | Cook et al. | Apr. 13, 1943 |
| 2,575,003 | Caron et al. | Nov. 13, 1951 |
| 2,626,207 | Wies et al. | Jan. 20, 1953 |